United States Patent
Kim et al.

(10) Patent No.: US 10,941,989 B2
(45) Date of Patent: Mar. 9, 2021

(54) AIR CONDITIONER AND METHOD OF MANUFACTURING THE SAME

(71) Applicant: LG Electronics Inc., Seoul (KR)

(72) Inventors: Hongseong Kim, Seoul (KR); Sangyeul Lee, Seoul (KR); Juhyok Kim, Seoul (KR); Sungho Yun, Seoul (KR)

(73) Assignee: LG Electronics Inc., Seoul (KR)

(*) Notice: Subject to any disclaimer, the term of this patent is extended or adjusted under 35 U.S.C. 154(b) by 31 days.

(21) Appl. No.: 16/065,631

(22) PCT Filed: Nov. 29, 2016

(86) PCT No.: PCT/KR2016/013865
§ 371 (c)(1),
(2) Date: Jun. 22, 2018

(87) PCT Pub. No.: WO2017/111333
PCT Pub. Date: Jun. 29, 2017

(65) Prior Publication Data
US 2019/0017755 A1    Jan. 17, 2019

(30) Foreign Application Priority Data

Dec. 22, 2015  (KR) .................. 10-2015-0184182

(51) Int. Cl.
*F28F 9/26* (2006.01)
*B23P 15/26* (2006.01)
(Continued)

(52) U.S. Cl.
CPC .............. *F28F 9/268* (2013.01); *B21D 53/08* (2013.01); *B23K 1/0012* (2013.01);
(Continued)

(58) Field of Classification Search
CPC .... F28F 9/013; F28F 9/264; F28F 1/32; F28F 2275/06; F28D 1/0477; F28D 1/053;
(Continued)

(56) References Cited

U.S. PATENT DOCUMENTS 6,405,428 B1 *  6/2002  Mun .................... B21D 53/085
                                               29/33 G
8,033,018 B2 * 10/2011  Dees ...................... B21D 39/06
                                               29/890.047

(Continued)

FOREIGN PATENT DOCUMENTS

EP       1504840 A1 *  2/2005  ........... B23K 26/244
JP       S57159261      10/1982
(Continued)

OTHER PUBLICATIONS

International Search Report in International Application No. PCT/KR2016/013865, dated Feb. 24, 2017, 31 pages.

*Primary Examiner* — Devon Russell
(74) *Attorney, Agent, or Firm* — Fish & Richardson P.C.

(57) ABSTRACT

An air conditioner and a method of manufacturing the same are disclosed. The air conditioner includes an indoor heat exchanger and an outdoor heat exchanger, each including a plurality of refrigerant pipes and at least one connection pipe for interconnecting the refrigerant pipes, a brazing hole formed in the connection pipe by punching, and a brazing ring mounted over the brazing hole, wherein portions of the refrigerant pipes are inserted into the connection pipe through inlet ends of the connection pipe, the brazing hole is located between ends of the refrigerant pipes and the inlet ends of the connection pipe, and the connection pipe is bonded to the refrigerant pipes by heating at least one selected from between the refrigerant pipes and the brazing ring.

5 Claims, 8 Drawing Sheets

(51) Int. Cl.
*B23K 33/00* (2006.01)
*B23K 1/00* (2006.01)
*B21D 53/08* (2006.01)
*F28F 9/013* (2006.01)
*B23K 31/12* (2006.01)
*B21D 53/06* (2006.01)
*F28D 1/047* (2006.01)
*F28D 1/04* (2006.01)

(52) U.S. Cl.
CPC .......... *B23K 31/125* (2013.01); *B23K 33/006* (2013.01); *B23P 15/26* (2013.01); *F28F 9/013* (2013.01); *B21D 53/06* (2013.01); *F28D 1/04* (2013.01); *F28D 1/0477* (2013.01); *F28F 2275/045* (2013.01); *F28F 2275/06* (2013.01)

(58) Field of Classification Search
CPC .. F28D 1/32; B21D 53/08; B23K 1/18; B23K 1/0012; B23K 33/06
See application file for complete search history.

(56) References Cited

U.S. PATENT DOCUMENTS

| | | | |
|---|---|---|---|
| 10,391,836 B2* | 8/2019 | Suzuki | B60H 1/00385 |
| 2009/0200363 A1* | 8/2009 | Means | B23K 1/0012 |
| | | | 228/246 |
| 2013/0245376 A1* | 9/2013 | Oku | A61B 1/00071 |
| | | | 600/129 |

FOREIGN PATENT DOCUMENTS

| | | |
|---|---|---|
| JP | 2008164108 | 7/2008 |
| KR | 100483958 | 4/2005 |
| KR | 1020090091529 | 8/2009 |
| KR | 101265285 | 5/2013 |
| KR | 101422074 | 7/2014 |

* cited by examiner

AIR CONDITIONER AND METHOD OF MANUFACTURING THE SAME

CROSS-REFERENCE TO RELATED APPLICATIONS

This application is a National Stage application under 35 U.S.C. § 371 of International Application No. PCT/KR2016/013865, filed on Nov. 29, 2016, which claims the benefit of Korean Application No. 10-2015-0184182, filed on Dec. 22, 2015. The disclosures of the prior applications are incorporated by reference in their entirety.

TECHNICAL FIELD

The present invention relates to a method of brazing pipes in an air conditioner using a pipe insertion and brazing technology.

BACKGROUND ART

An air conditioner is an apparatus that cools/heat a room or purifies air to provide a comfortable indoor environment to users.

The air conditioner may be classified as a split-type air conditioner, in which an indoor unit and an outdoor unit are provided separately, or an integrated-type air conditioner, in which an indoor unit and an outdoor unit are combined into a single apparatus. In addition, depending on the capacity of the air conditioner, the air conditioner may be classified as a single-type air conditioner, which is configured to be used in a small space while having a capacity capable of driving a single indoor unit, a middle or large-sized air conditioner, which is configured to have a sufficient capacity to be used in an office or a restaurant, or a multi-type air conditioner, which is configured to have a sufficient capacity to drive a plurality of indoor units.

The split-type air conditioner includes an indoor unit, which is installed in a room to supply hot air or cool air into a space to be air-conditioned, and an outdoor unit, which compresses or expands refrigerant such that the indoor unit performs sufficient heat exchange.

The air conditioner operates according to a cycle in which the refrigerant is circulated and sequentially undergoes compression, condensation, expansion, and evaporation to transfer heat. In the summer season, the air conditioner operates according to a cooling cycle, in which heat is discharged from a room. In the winter season, the air conditioner operates according to a heating cycle, in which heat is supplied into the room. That is, the air conditioner serves as a heat pump.

Figure 1:
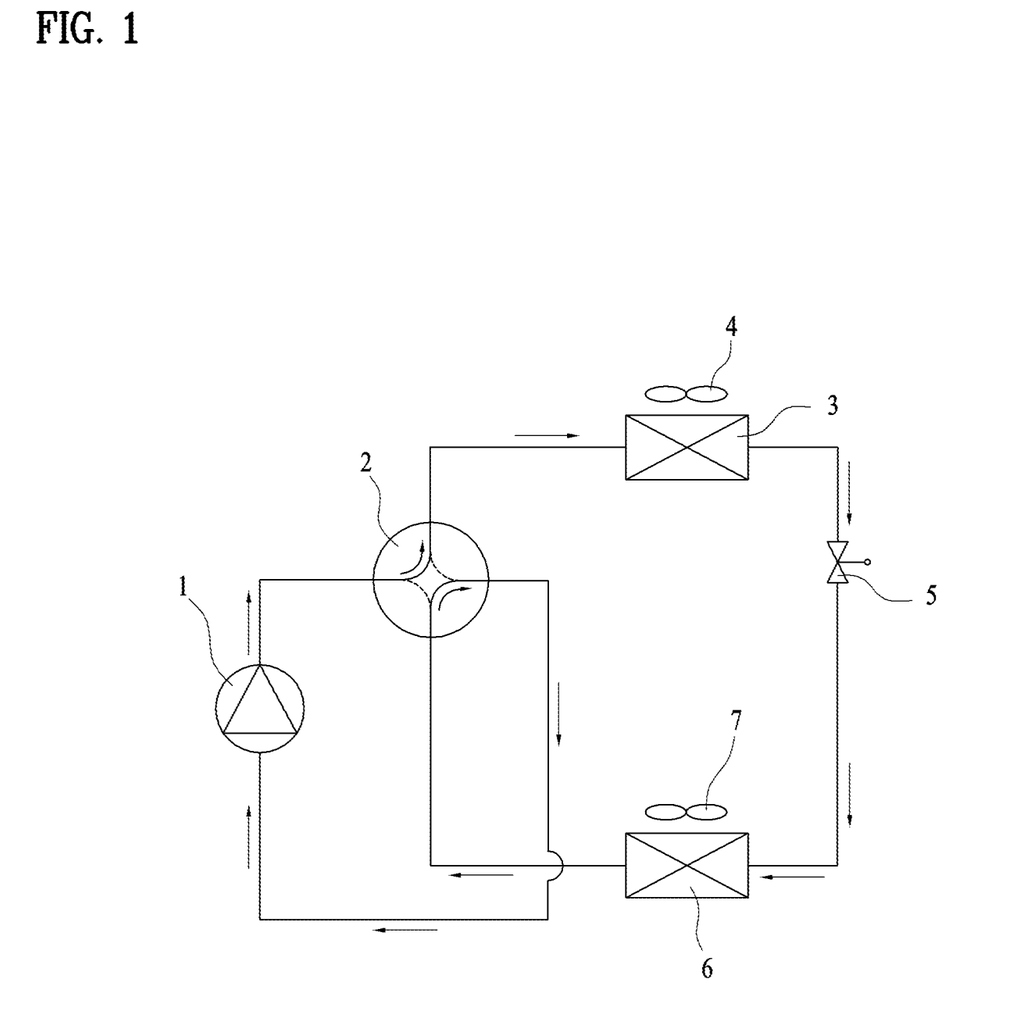
FIG. 1 is a view showing the general structure of a heat exchanger provided in an air conditioner.

FIG. 1 is a view showing a cooling cycle of a general air conditioner. As shown in FIG. 1, the air conditioner includes a compressor 1, a four-way valve 2, an outdoor heat exchanger 3, an outdoor fan 4, an expansion valve 5, an indoor heat exchanger 6, and an indoor fan 7.

The cooling process is performed as follows. Low-temperature, low-pressure gaseous refrigerant, introduced into the compressor 1 from the indoor heat exchanger 6, is pressurized into high-temperature, high-pressure gaseous refrigerant as the result of pressurization performed by the compressor 1. The high-temperature, high-pressure gaseous refrigerant is discharged into the outdoor heat exchanger 3 through the four-way valve 2.

While flowing in the outdoor heat exchanger 3, the refrigerant exchanges heat with external air suctioned into the outdoor unit by the driving of the outdoor fan 4. As a result, the refrigerant becomes room-temperature, high-pressure liquefied refrigerant. The room-temperature, high-pressure liquefied refrigerant is discharged to the expansion valve 5. While flowing in the expansion valve 5, the refrigerant becomes low-temperature, low-pressure liquefied refrigerant such that the refrigerant can be easily evaporated. The low-temperature, low-pressure liquefied refrigerant is discharged to the indoor heat exchanger 6. The refrigerant discharged to the indoor heat exchanger 6 exchanges heat with the air around the indoor heat exchanger 6. As a result, the refrigerant becomes low-temperature, low-pressure gaseous refrigerant. The low-temperature, low-pressure gaseous refrigerant is introduced into the compressor 1 through the four-way valve 2.

When the air conditioner is operated in a heating mode, the outdoor heat exchanger 3 serves as an evaporator, and the indoor heat exchanger 6 serves as a condenser. When the air conditioner is operated in a cooling mode, the outdoor heat exchanger 3 serves as a condenser, and the indoor heat exchanger 6 serves as an evaporator.

Meanwhile, the indoor heat exchanger and the outdoor heat exchanger of the air conditioner each include a plurality of refrigerant pipes, along which the refrigerant flows. The refrigerant pipes are arranged side by side while being connected to fins, which are provided to improve heat exchange efficiency. Connection pipes are used to interconnect ends of the refrigerant pipes. In general, the connection pipes are brazed to the refrigerant pipes using brazing rings. The connection pipes are inserted into the refrigerant pipes. Before insertion, the brazing rings are mounted to the connection pipes.

Brazing is performed in the state in which the refrigerant pipes are arranged so as to be perpendicular to the ground and the connection pipes having the brazing rings mounted thereto are connected to the refrigerant pipes above the refrigerant pipes. The brazing rings melt and enter gaps between the connection pipes and the refrigerant pipes. However, brazing efficiency is lowered due to gravity, whereby the defect rate is increased.

DISCLOSURE

Technical Problem

An object of the present invention devised to solve the problem lies in an air conditioner, wherein brazing rings smoothly enter gaps between refrigerant pipes and a connection pipe during brazing, thereby reducing the brazing defect rate.

Another object of the present invention devised to solve the problem lies in an air conditioner, wherein brazing durability is improved, thereby increasing the coupling force between the refrigerant pipes and the connection pipe.

Technical Solution

The object of the present invention can be achieved by providing a method of manufacturing an air conditioner including an indoor heat exchanger or an outdoor heat exchanger including a plurality of refrigerant pipes and at least one connection pipe for interconnecting the refrigerant pipes, a compressor, and an expansion valve, the method including punching a portion of the connection pipe to form a brazing hole in the connection pipe, mounting a brazing ring to the punched portion of the connection pipe, inserting the refrigerant pipes into the connection pipe through inlet ends of the connection pipe, and brazing the connection pipe to the refrigerant pipes.

At the punching step, the brazing hole may be formed in a portion of the connection pipe into which the refrigerant pipes are inserted.

The brazing hole may include a plurality of brazing holes formed along the circumference of one side of the connection pipe.

The width of each of the brazing holes may be smaller than that of the brazing ring.

The brazing holes may be arranged at predetermined intervals.

The diameter of the brazing ring may be larger than that of the connection pipe.

The refrigerant pipes may be inserted into the connection pipe to a depth that is a predetermined distance greater than a distance between the brazing hole and the inlet ends of the connection pipe.

The brazing hole may be located between the inlet ends of the connection pipe and ends of the refrigerant pipes.

The brazing hole may be formed so as to be closer to the ends of the refrigerant pipes than to the inlet ends of the connection pipe.

The brazing step may include preheating the refrigerant pipes and heating the brazing ring.

The brazing step may be performed in the state in which the refrigerant pipes and the connection pipe are arranged so as to be perpendicular to the ground and the connection pipe is located so as to be more distant from the ground than the refrigerant pipes.

In another aspect of the present invention, provided herein is an air conditioner including an indoor heat exchanger and an outdoor heat exchanger, each including a plurality of refrigerant pipes and at least one connection pipe for interconnecting the refrigerant pipes, a brazing hole formed in the connection pipe by punching, and a brazing ring mounted over the brazing hole, wherein portions of the refrigerant pipes are inserted into the connection pipe through inlet ends of the connection pipe, the brazing hole is located between ends of the refrigerant pipes and the inlet ends of the connection pipe, and the connection pipe is bonded to the refrigerant pipes by heating.

The brazing hole may include a plurality of brazing holes formed along the circumference of an arbitrary section of the connection pipe in the longitudinal direction of the connection pipe.

The brazing holes may be arranged at predetermined intervals.

The brazing holes may be formed so as to be closer to the ends of the refrigerant pipes than to the inlet ends of the connection pipe.

The refrigerant pipes and the connection pipe may be arranged so as to be perpendicular to the ground, and the connection pipe may be located so as to be more distant from the ground than the refrigerant pipes.

The width of the brazing hole may be smaller than that of the brazing ring.

Advantageous Effects

According to the present invention, the brazing rings smoothly enter the gaps between the refrigerant pipes and the connection pipe, thereby reducing the brazing defect rate.

In addition, the brazing rings smoothly enter the gaps between the refrigerant pipes and the connection pipe by gravity.

In addition, brazing durability is improved, thereby increasing the coupling force between the refrigerant pipes and the connection pipe.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Reference will now be made in detail to the preferred embodiments of the present invention, examples of which are illustrated in the accompanying drawings. It should be noted herein that these embodiments are only for illustrative purposes and the protection scope of the invention is not limited thereto. Wherever possible, the same reference numbers will be used throughout the drawings to refer to the same or like parts.

Figure 2:
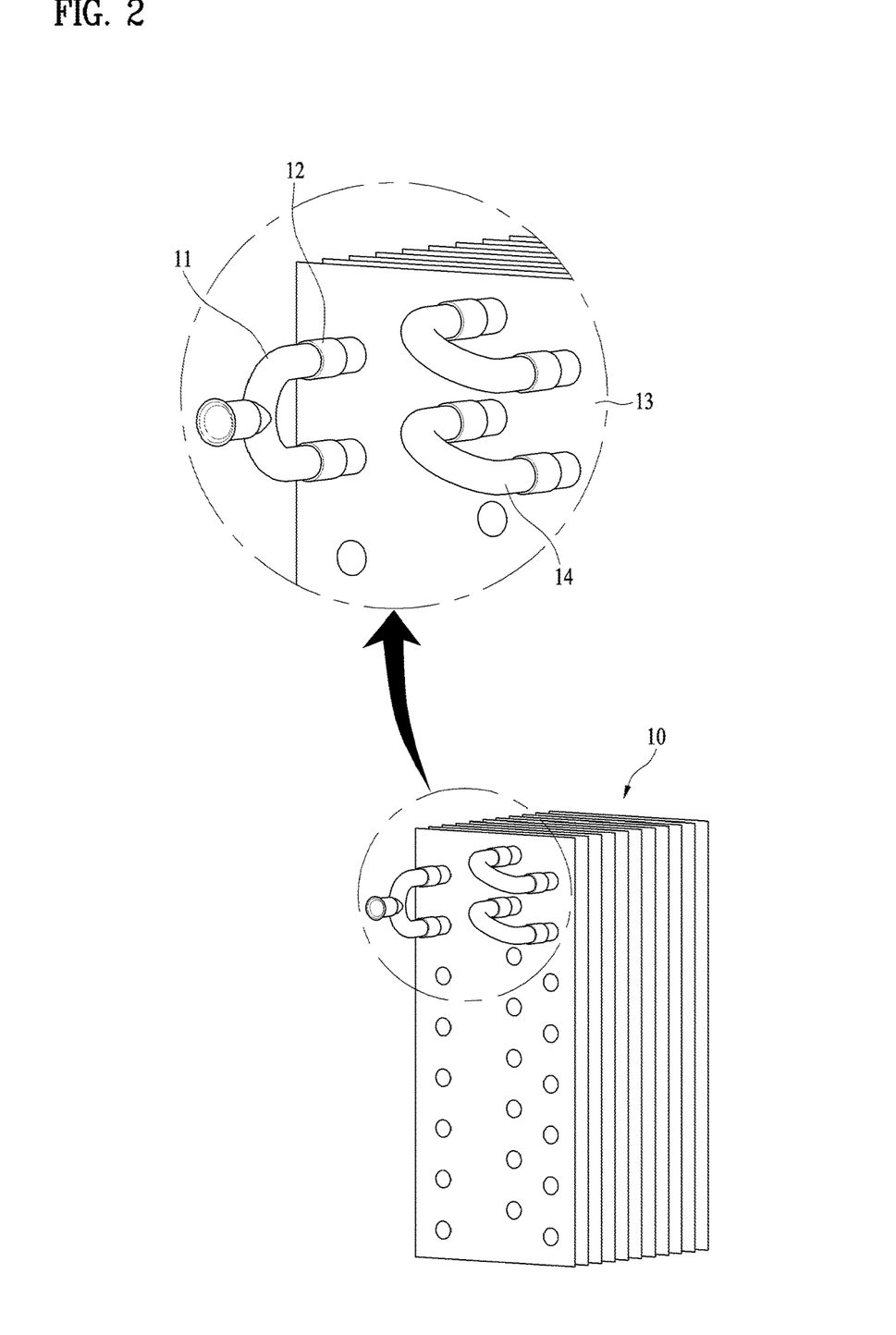
FIG. 2 is a view showing the structure of an indoor heat exchanger or an outdoor heat exchanger.

FIG. 2 is a view showing a heat exchanger 10. The heat exchanger 10 may be the indoor heat exchanger 6 or the outdoor heat exchanger 3 shown in FIG. 1. The heat exchanger 10 includes a plurality of refrigerant pipes 12, in which high-temperature or lower-temperature refrigerant flows to increase or decrease the temperature of air, and a plurality of fins 13 for increasing heat exchange between the refrigerant flowing in the refrigerant pipes 12 and external air.

As shown in FIG. 2, the refrigerant pipes 12 may be arranged parallel to each other, and the fins 13 may be arranged at predetermined intervals so as to be perpendicular to the refrigerant pipes 12. Each refrigerant pipe 12 may be an elongated hollow pipe. Each fin 13 may be a thin metal sheet. Air may be introduced into gaps between the respective fins 13 to improve the efficiency of heat exchange between the refrigerant and the air.

Each fin 13 may have various shapes. In order to further improve the efficiency of heat exchange between the refrigerant and the air, a plurality of holes (not shown) may be formed in each fin 13 such that the air flows through the holes. The shapes of each fin 13 are well known in the art to which the present invention pertain; therefore, a detailed description thereof will be omitted.

The refrigerant pipes 12 are arranged parallel to each other, and are connected to each other using connection pipes 11 and 14. One connection pipe 11 or 14 may interconnect ends of two refrigerant pipes 12. A plurality of refrigerant pipes 12 is connected to each other via a plurality of connection pipes 11 and 14 in order to constitute a plurality of long channels. The refrigerant flows in the long channels, which are formed by the refrigerant pipes 12 and the connection pipes 11 and 14, and passes perpendicularly through the fins 13 in a serpentine fashion to exchange heat with external air. The long channels, which are formed by the connection pipes 11 and 14 and the refrigerant pipes 12, extend through the fins 13, thereby improving the efficiency of heat exchange.

The connection pipes 11 and 14 may include Y-shaped connection pipes 11 and U-shaped connection pipes 14. The Y-shaped connection pipes 11 serve as inlets, through which the refrigerant is introduced into the heat exchanger 10, or outlets, through which the refrigerant is discharged from the heat exchanger 10. The U-shaped connection pipes 14 interconnect ends of the refrigerant pipes 12 such that the refrigerant passes along the refrigerant pipes 12 in the heat exchanger 10.

The refrigerant flows as follows. After reaching the heat exchanger 10, the refrigerant is introduced into the refrigerant pipes 12 through the Y-shaped connection pipes 11. Subsequently, the refrigerant passes perpendicularly through the fins 13. At this time, heat exchange is performed. The refrigerant introduced into one end of the heat exchanger 10 flows to the other end of the heat exchanger 10 along the refrigerant pipes 12, and then passes perpendicularly through the fins 13 via the U-shaped connection pipes 14 provided at the ends of the refrigerant pipes 12. After flowing several times in a serpentine fashion, the refrigerant flows to the other end of the heat exchanger 10. The refrigerant is discharged from the other end of the heat exchanger 10 through the Y-shaped connection pipes 11 provided at the ends of the refrigerant pipes 12. After being discharged through the Y-shaped connection pipes 11, the refrigerant flows to a compressor or an expansion valve.

Referring to FIGS. 3 to 6, one Y-shaped connection pipe 11 is shown as being connected to two refrigerant pipes 12 for the convenience of description. Of course, one U-shaped connection pipe 14 may be connected to two refrigerant pipes 12. Hereinafter, therefore, the Y-shaped connection pipe 11 and the U-shaped connection pipe 14 will simply be referred to as a connection pipe 11. In addition, a portion of the heat exchanger 10 from which the refrigerant is discharged after exchanging heat will be described as an embodiment. Consequently, the inlet ends of the connection pipe 11, which will be described below, indicate portions of the connection pipe 11 that are connected to the refrigerant pipes 12, and the ends of the refrigerant pipes 12 indicate portions of the refrigerant pipes 12 that are connected to the connection pipe 11.

Figure 3:
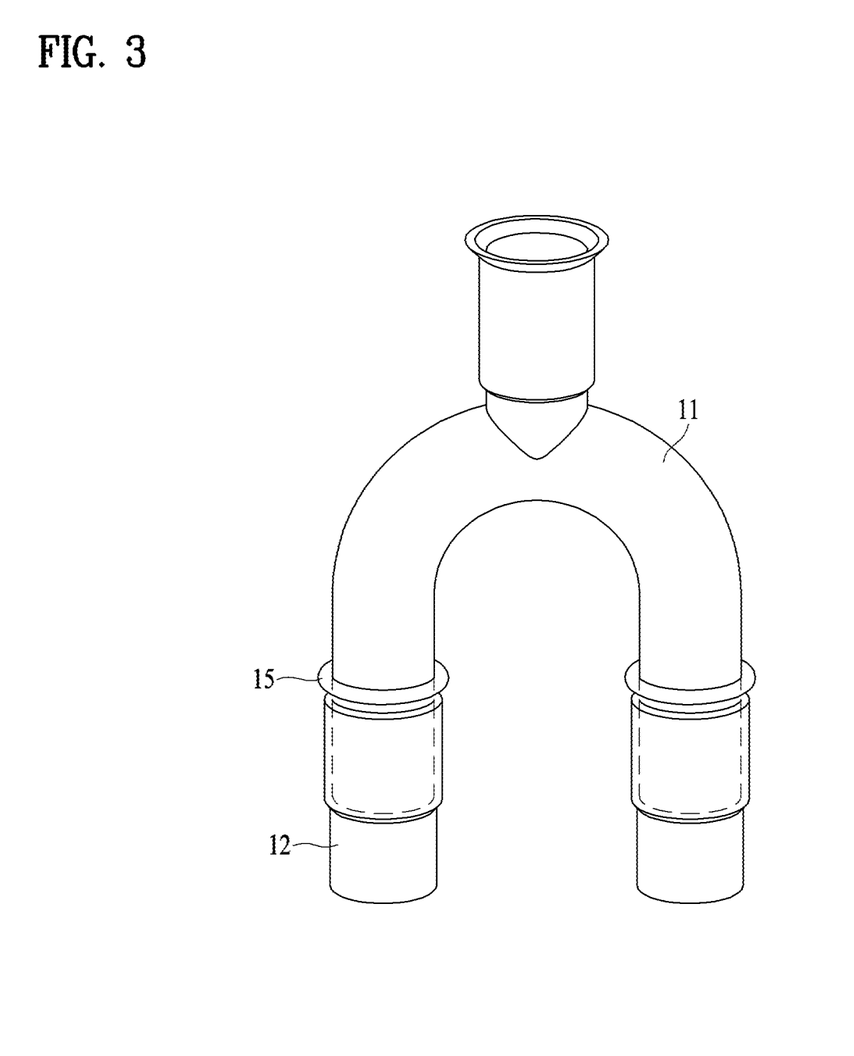
FIG. 3 is a view showing a conventional method of brazing a connection pipe to refrigerant pipes.
Figure 4:
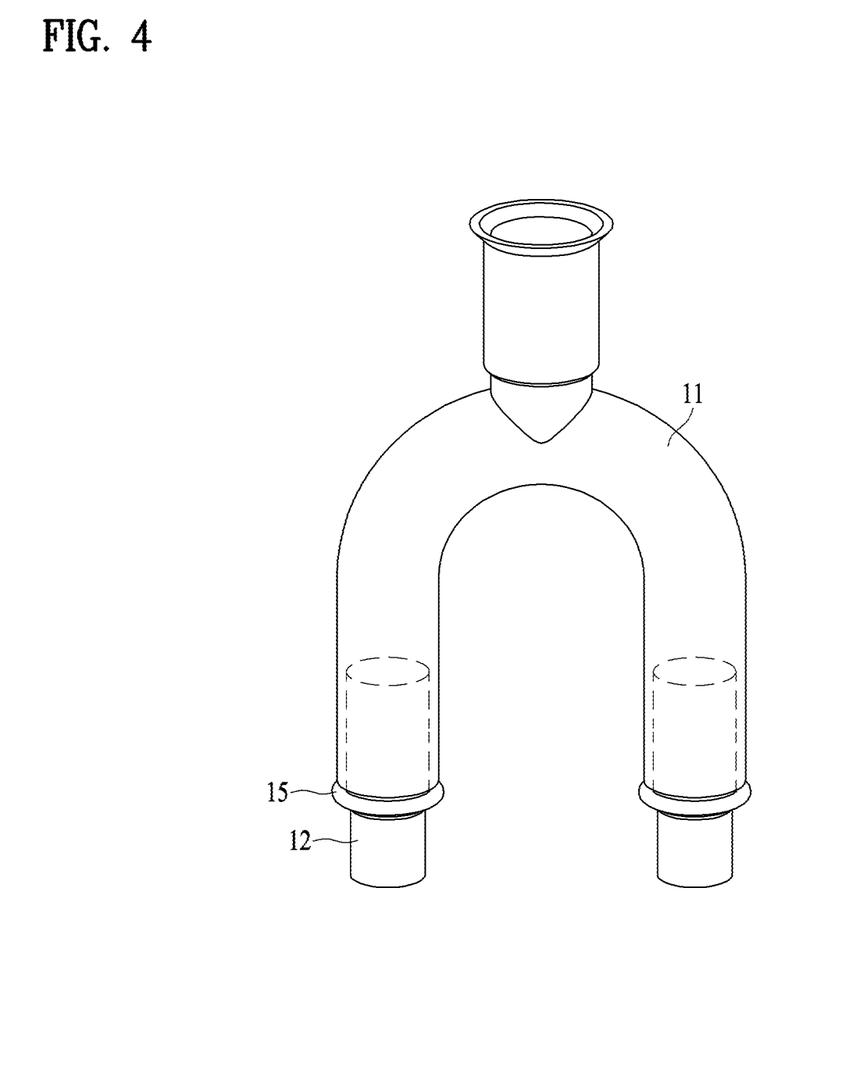
FIG. 4 is a view showing another conventional method of brazing a connection pipe to refrigerant pipes.

FIGS. 3 and 4 are views showing conventional methods of brazing the connection pipe 11 to the refrigerant pipes 12. In order to easily perform the brazing process, the connection pipe 11 may be generally coupled to the refrigerant pipes 12 in the state in which the refrigerant pipes 12 are arranged so as to be perpendicular to the ground. That is, brazing is performed in the state in which the refrigerant pipes 12 are disposed on the ground and the connection pipe 11 is disposed on the refrigerant pipes 12. However, the positional relationship between the connection pipe 11 and the refrigerant pipes 12 is not limited thereto.

Referring to FIG. 3, ends of the refrigerant pipes 12 are expanded, and the connection pipe 11 is inserted into the expanded ends of the refrigerant pipes 12. Brazing rings 15 are mounted to the connection pipe 11 in advance, and then the connection pipe 11 is inserted into the refrigerant pipes 12. After being set as shown in FIG. 3, the brazing rings 15 come into contact with the ends of the refrigerant pipes 12. In this state, the brazing rings 15 are heated using a torch, with the result that the liquid-state brazing rings 15 flow into gaps between the connection pipe 11 and the refrigerant pipes 12. Consequently, the connection pipe 11 is brazed to the refrigerant pipes 12.

In FIG. 3, however, the channel is suddenly narrowed, since the connection pipe 11 is inserted into the refrigerant pipes 12. As a result, pressure loss occurs, and the refrigerant does not flow smoothly. In addition, during brazing, the liquid-phase brazing rings 15 may flow under the connections between the refrigerant pipes 12 and the connection pipe 11. If the liquid-phase brazing rings 15 leak into the refrigerant pipes 12, the brazing rings 15 disturb the flow of the refrigerant in the refrigerant pipes 12. Furthermore, the heat exchanger 10 may be damaged due to imbalance in pressure between the refrigerant pipes 12 having the brazing rings 15 therein and the refrigerant pipes 12 having no brazing rings 15.

Referring to FIG. 4, the refrigerant pipes 12 are inserted into the connection pipe 11. In this case, it is possible to prevent pressure loss caused as the result of the channel being suddenly narrowed and imbalance in flow of the refrigerant, which occur in the case shown in FIG. 3. In FIG. 4, brazing rings 15 are mounted to the refrigerant pipes 12, and then the refrigerant pipes 12 are inserted into the connection pipe 11. After the insertion is completed, the brazing rings 15 are in contact with the inlet ends of the connection pipe 11.

In this state, the brazing rings 15 are heated using a torch, with the result that the liquid-state brazing rings 15 enter gaps between the connection pipe 11 and the refrigerant pipes 12 according to a capillary phenomenon.

In FIG. 4, however, the liquid-phase brazing rings 15 do not entirely enter the gaps between the connection pipe 11 and the refrigerant pipes 12, but a portion of each of the liquid-phase brazing rings 15 flows down along the refrigerant pipes 12 due to gravity.

Figure 5:
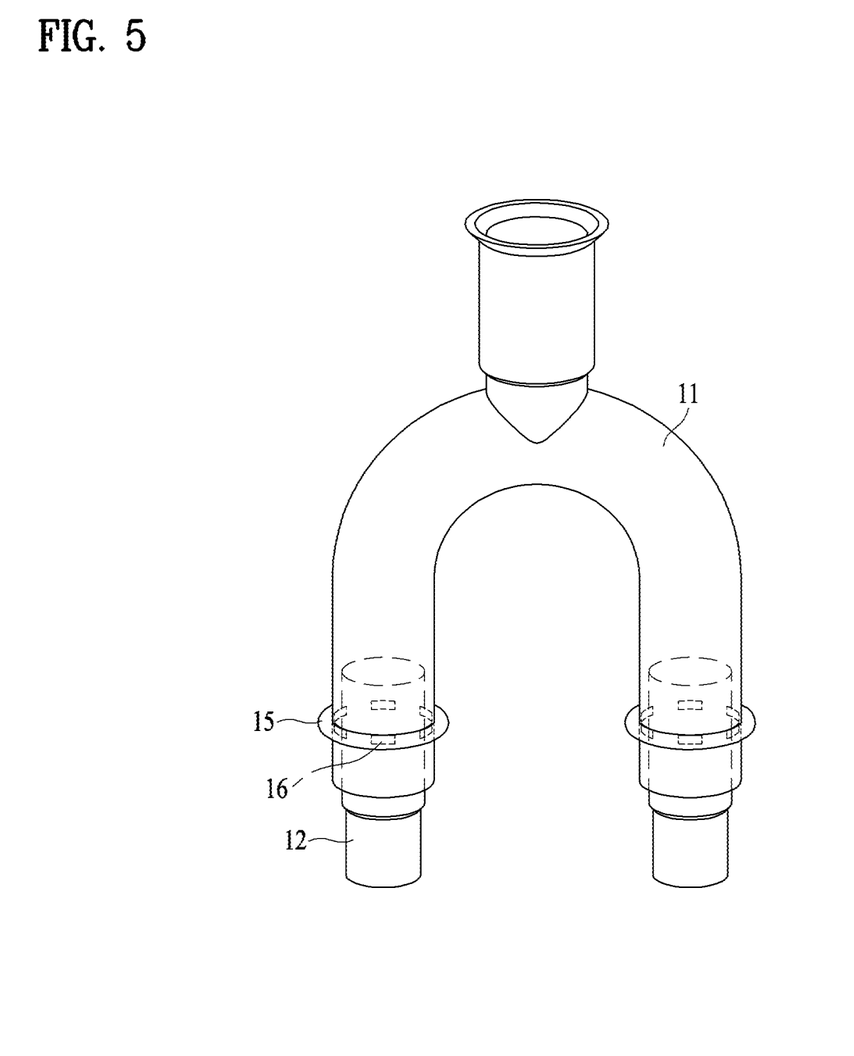
FIG. 5 is a view showing a method of brazing a connection pipe to refrigerant pipes in accordance with an embodiment of the present invention.

FIG. 5 shows an embodiment of the present invention that solves the problems caused in FIGS. 3 and 4. The refrigerant pipes 12 are inserted into the connection pipe 11 in the same manner as shown in FIG. 4. In the embodiment of the present invention shown in FIG. 5, brazing holes 16 may be formed in the connection pipe 11. The brazing holes 16 may be formed in the connection pipe 11 by punching. The inside and outside of the connection pipe 11 communicate with each other through the brazing holes 16. When the brazing rings 15 are heated, the liquid-phase brazing rings 15 enter the brazing holes 16.

The brazing holes 16 may be formed in a portion of the connection pipe 11 that faces the refrigerant pipes 12 after the refrigerant pipes 12 are inserted into the connection pipe 11. That is, the brazing holes 16 may be formed in a portion of the connection pipe 11 between the ends of the refrigerant pipes 12 and the inlet ends of the connection pipe 11 after the refrigerant pipes 12 are inserted into the connection pipe 11 such that the liquid-phase brazing rings 15 are uniformly distributed in the gaps between the connection pipe 11 and the refrigerant pipes 12.

A plurality of brazing holes 16 may be formed along the circumference of the connection pipe 11. The brazing holes 16 may be arranged at predetermined intervals such that the liquid-phase brazing rings 15 uniformly enter the brazing holes 16. In addition, the brazing holes 16 are arranged along the circumference of an arbitrary section of the connection pipe 11 in the longitudinal direction of the connection pipe 11, since each of the brazing rings 15 is formed in a ring shape.

As shown in FIG. 5, the refrigerant pipes 12 are inserted into the connection pipe 11 more deeply than the brazing rings 15 in the state in which the brazing rings 15 are mounted over the brazing holes 16 formed in the connection pipe 11. In this state, the brazing rings 15 are heated using a torch, with the result that the liquid-state brazing rings 15 enter gaps between the connection pipe 11 and the refrigerant pipes 12 through the brazing holes 16. The liquid-phase brazing rings 15 flow both upward and downward according to a capillary phenomenon, and enter the gaps between the connection pipe 11 and the refrigerant pipes 12.

The brazing rings 15 are affected by gravity in the downward direction. As a result, a larger amount of liquid-phase brazing rings 15 enters more quickly the gaps between the connection pipe 11 and the refrigerant pipes 12 in the downward direction. For this reason, the brazing holes 16 may be formed so as to be closer to the ends of the refrigerant pipes 12 than to the inlet ends of the connection pipe 11 such that the liquid-phase brazing rings 15 uniformly enter the gaps between the connection pipe 11 and the refrigerant pipes 12.

Meanwhile, the width of each of the brazing holes 16 in the longitudinal direction of the connection pipe 11 may be slightly smaller than that of each of the brazing rings 15 in the longitudinal direction of the connection pipe 11 such that the brazing rings 15 are easily mounted over the brazing holes 16.

Figure 6:
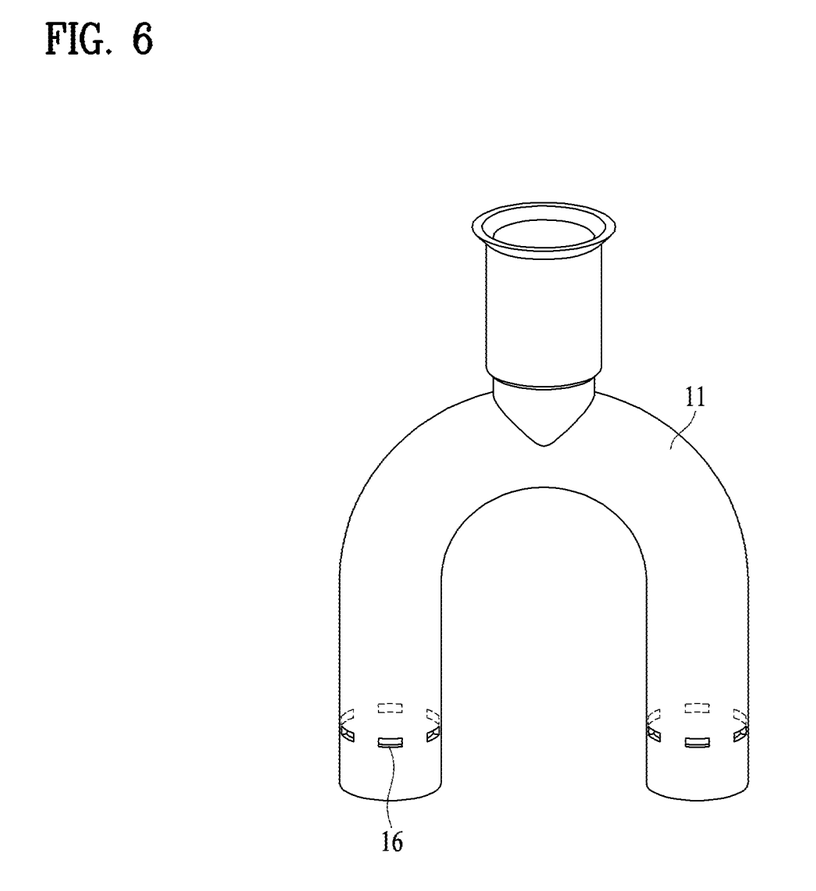
FIG. 6 is a view showing brazing holes formed in a connection pipe according to an embodiment of the present invention.
Figure 7:
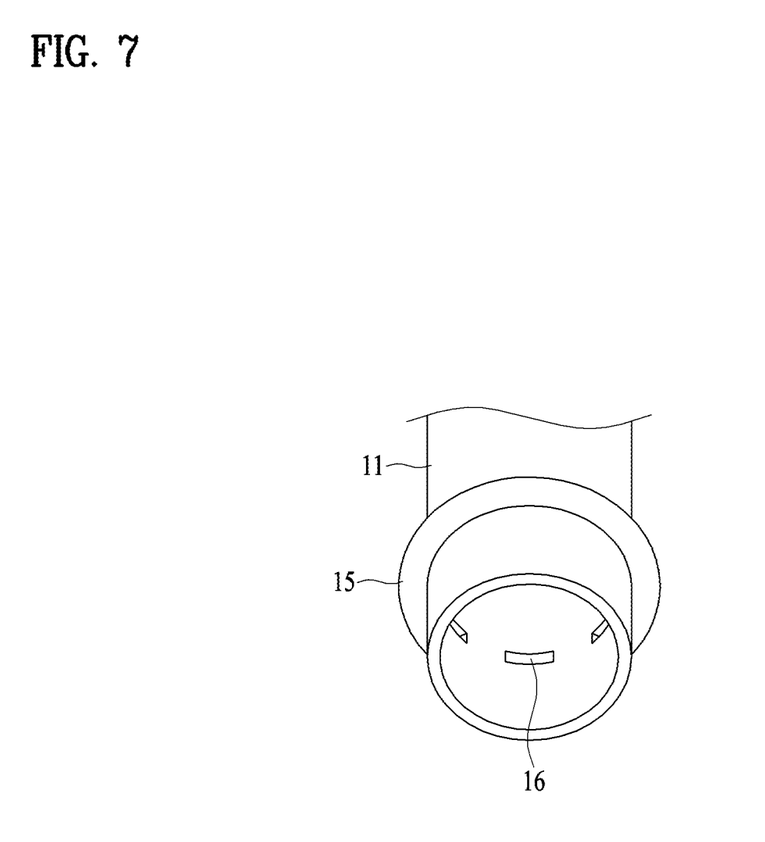
FIG. 7 is a bottom perspective view showing a brazing ring provided on the connection pipe.

FIGS. 6 and 7 are views showing the state before the refrigerant pipes 12 are inserted into the connection pipe 11. FIG. 6 is a view showing the connection pipe 11 before the brazing rings 15 are mounted thereto. The shape and number of brazing holes 16 may be changed as long as the characteristics of the brazing holes 16 are not deteriorated.

Figure 8:
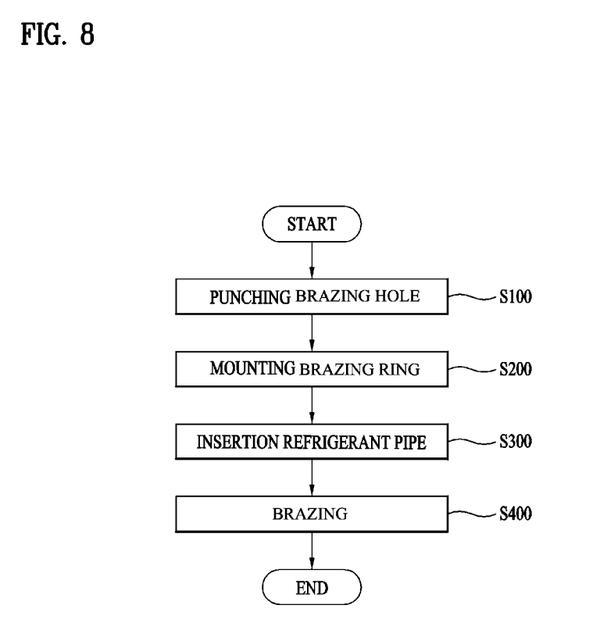
FIG. 8 is a flowchart showing a method of brazing a connection pipe to refrigerant pipes.

FIG. 8 is a flowchart showing a manufacturing method according to an embodiment of the present invention. Specifically, FIG. 8 is a flowchart showing a method of manufacturing an air conditioner including an indoor heat exchanger or an outdoor heat exchanger including a plurality of refrigerant pipes 12 and at least one connection pipe 11 for interconnecting the refrigerant pipes 12, a compressor, and an expansion valve. The manufacturing method includes a punching step (S100) of punching a portion of the connection pipe 11 to form brazing holes 16 in the connection pipe 11, a mounting step (S200) of mounting brazing rings 15 to the punched portion of the connection pipe 11, an insertion step (S300) of inserting the refrigerant pipes 12 into the connection pipe 11 through inlet ends of the connection pipe 11, and a brazing step (S400) of brazing the connection pipe 11 to the refrigerant pipes 12.

At the punching step (S100), the brazing holes 16 may be formed in a portion of the connection pipe 11 into which the refrigerant pipes 12 can be inserted. The brazing holes 16 formed at the punching step (S100) are formed in a portion of the connection pipe 11 between the inlet ends of the connection pipe 11 and the ends of the refrigerant pipes 12 in order to reduce the brazing defect rate at the brazing step (S400).

At the punching step (S100), a plurality of brazing holes 16 may be formed along the circumference of one side of the connection pipe 11. The brazing holes 16 are formed by punching so as to be arranged at predetermined intervals such that the brazing rings 15 uniformly enter the brazing holes 16 at the brazing step (S400).

The width of each of the brazing holes 16 formed at the punching step (S100) in the longitudinal direction of the connection pipe 11 may be slightly smaller than that of each of the brazing rings in the longitudinal direction of the connection pipe 11 such that the brazing rings 15 are easily mounted over the brazing holes 16.

The diameter of each of the brazing rings 15 mounted at the mounting step (S200) is larger than that of the connection pipe 11. The reason for this is that the brazing defect rate is minimized when the brazing rings 15 enter the inside of the connection pipe 11 from the outside of the connection pipe 11, since the refrigerant pipes 12 are inserted into the connection pipe 11.

The brazing holes 16, provided between the inlet ends of the connection pipe 11 and the ends of the refrigerant pipes 12, may be formed so as to be closer to the ends of the refrigerant pipes 12. When the brazing rings 15 are heated at the brazing step (S400), the liquid-state brazing rings 15 enter gaps between the connection pipe 11 and the refrigerant pipes 12 through the brazing holes 16 formed at the punching step (S100) according to a capillary phenomenon. In an embodiment of the present invention, however, the refrigerant pipes 12 are arranged so as to be perpendicular to the ground, and the connection pipe 11 is provided on the refrigerant pipes 12. During brazing, therefore, gravity is further applied to the liquid-state brazing rings 15. As a result, a larger amount of liquid-phase brazing rings 15 enters the gaps between the connection pipe 11 and the refrigerant pipes 12 in the downward direction. For this reason, the brazing holes 16 may be formed so as to be closer to the ends of the refrigerant pipes 12 than to the inlet ends of the connection pipe 11.

After the punching step (S100), the mounting step (S200), and the insertion step (S300) are performed, the brazing step (S400) is finally performed. At the brazing step (S400), the brazing rings 15 are heated using a torch.

The brazing step (S400) includes a preheating step of preheating the refrigerant pipes 12 and a heating step of heating the brazing rings 15. When the brazing rings 15 are melted using the torch, the molten brazing rings 15 tend to flow in the state of clinging to the high-temperature portion. When the preheating step is performed, therefore, the liquid-state brazing rings 15 more smoothly enter the gaps between the connection pipe 11 and the refrigerant pipes 12 through the brazing holes 16.

Mode for Invention

Various embodiments have been described in the best mode for carrying out the invention.

INDUSTRIAL APPLICABILITY

The present invention provides an air conditioner, wherein brazing rings smoothly enter gaps between refrigerant pipes and a connection pipe during brazing, thereby reducing the brazing defect rate, and a method of manufacturing the same.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. An air conditioner comprising:
    an indoor heat exchanger and an outdoor heat exchanger, each comprising a plurality of refrigerant pipes and at least one connection pipe connected to the refrigerant pipes; and
    a plurality of brazing holes defined along a circumference of the connection pipe, the connection pipe extending in a longitudinal direction,
    wherein the connection pipe comprises inlet ends comprising a first inlet end that receives a portion of a first refrigerant pipe among the refrigerant pipes, and a second inlet end that receives a portion of a second refrigerant pipe among the refrigerant pipes,
    wherein the plurality of brazing holes comprise:
        a first group of brazing holes that are located between an end of the first refrigerant pipe and the first inlet end, the first group of brazing holes being located closer to the end of the first refrigerant pipe than to the first inlet end in the longitudinal direction, and
        a second group of brazing holes that are located between an end of the second refrigerant pipe and the second inlet end, the second group of brazing holes being located closer to the end of the second refrigerant pipe than to the second inlet end in the longitudinal direction,
    wherein the connection pipe is bonded to each of the refrigerant pipes by a sealing material that fills a gap between one of the refrigerant pipes and one of the inlet ends of the connection pipe, and
    wherein each of the plurality of brazing holes has a circumferential width in a circumference direction of the connection pipe and a longitudinal width in the longitudinal direction, the circumferential width being greater than the longitudinal width.

2. The air conditioner according to claim 1, wherein the plurality of brazing holes are arranged at predetermined intervals along the circumference of the connection pipe.

3. The air conditioner according to claim 1, wherein the refrigerant pipes and the connection pipe are arranged so as to be perpendicular to a surface of one of the indoor heat exchanger or the outdoor heat exchanger, and the connection pipe is located so as to be more distant from the surface of the one of the indoor heat exchanger or the outdoor heat exchanger than the refrigerant pipes.

4. The air conditioner according to claim 1, wherein the refrigerant pipes and the connection pipe are arranged so as to be perpendicular to a surface of one of the indoor heat exchanger or the outdoor heat exchanger, and the connection pipe is located so as to be more distant from the surface of the one of the indoor heat exchanger or the outdoor heat exchanger than the refrigerant pipes.

5. The air conditioner according to claim 1, wherein each of the plurality of brazing holes is configured to receive a brazing ring in a liquid state based on the brazing ring being liquefied along the circumference of the connection pipe, the sealing material being solidified from the brazing ring in the liquid state.

* * * * *